Dec. 20, 1927.
G. JALBERT
LAY FIGURE
Filed May 18, 1925
1,653,180
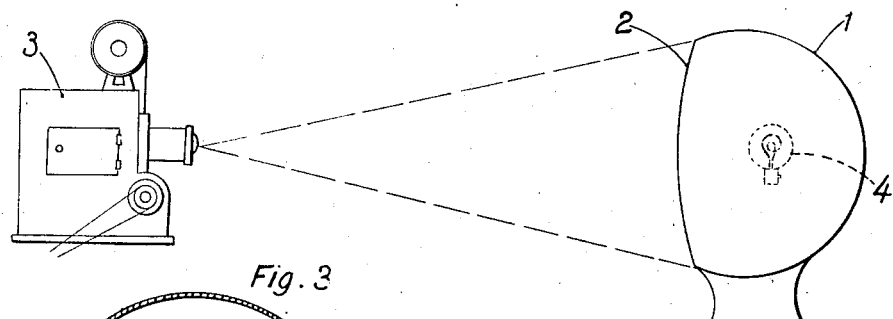
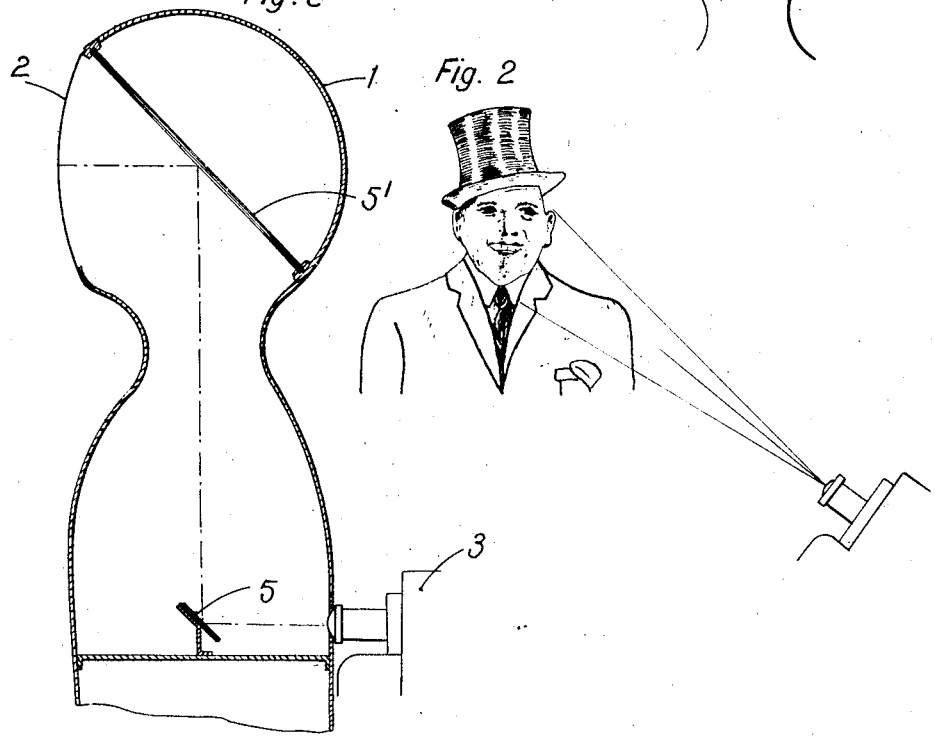
Inventor
G. Jalbert
By Marko Clark
Attys.

Patented Dec. 20, 1927.

1,653,180

UNITED STATES PATENT OFFICE.

GEORGES JALBERT, OF PARIS, FRANCE, ASSIGNOR OF ONE-HALF TO SOCIÉTÉ PARISIENNE DE CONFECTION, OF PARIS, FRANCE, A CORPORATION OF FRANCE.

LAY FIGURE.

Application filed May 18, 1925, Serial No. 31,188, and in France December 15, 1924.

My invention has for its object a lay figure whereof the face or optionally other parts—which consists of a smooth and slightly convex surface, forms a screen upon which moving or changing views are projected, representing a face which appears to pertain to the said lay figure.

It is particularly advantageous to project a cinematographic film, as it will afford an animated countenance and will produce a lifelike appearance, but it is also feasible to employ varied views which correspond for instance to different expressions of a face or of different faces.

The images may be directly projected, and in this event the apparatus is placed in front of the lay figure in a concealed position. The views can also be projected by transparence, and in this case the screen constituting the face will be sufficiently translucent; the projecting apparatus is disposed at any suitable point in the rear of the lay figure, or within the figure itself or its base. For this use, the beam of light should as a rule be brought perpendicular to the surface of the screen by means of suitable mirrors or prisms, or the like.

The translucent screen representing the face which serves for the projection of views by transparence may be suitably coloured in such manner that the face appearing on the screen will have the proper colour and brilliancy in order to correspond to the remainder of the lay figure.

In the case of direct projection, this can be carried out by forming the screen representing the face of a substance which is sufficiently translucent and is suitably coloured by the additional use of an illuminant of reduced power which is placed in the rear of the face, and for instance within the head of the lay figure.

The appended diagrammatic drawings show various embodiments of my said invention.

Figs. 1 and 2 are diagrammatic views in side elevation and perspective respectively of one embodiment of the invention. Fig. 3 is a side view in section of another form of the invention.

Figs 1 and 2 relate to direct projection. The head 1 of the lay figure comprises a face portion 2 having a smooth surface and a slightly convex form, the surface consisting of a substance which is suitable for the screen projection of photographic views. The views are projected by a special apparatus 3 employing successive views affording various expressions of a given face, or cinematographic views which give the lay figure a lifelike appearance due to the mobility of the features. Should colour effects be desired with these projections, the face 2 may be suitably coloured, and in this event it will consist of a translucent substance which is lighted from the rear, for instance by an illuminant 4 placed in the interior.

Fig. 2 shows an expression which is obtained on the face of the lay figure.

In the modification shown in Fig. 3, the face 2 employed as in the preceding case as a projection screen, but the said screen is now observed by tranparence, and the projection apparatus is herein disposed in the rear of the screen 2. In this example it is placed outside of the lay figure, and the mirrors 5 5' serve to bring the beam of light upon the screen.

Obviously, my said invention is not limited to the use of the human face, and it may further comprise the use of animals' faces. It will also be understood that the hands or other parts of the body of a lay figure may be formed in such manner as to serve as a projection screen for views of the corresponding parts of the body, and in the same manner as for the head, these parts may give the impression of various movements.

It is also obvious that the lay figures according to my invention, may not only be employed for advertising purposes, which is their principal use, but may also be utilized on the stage, thus affording various illusion effects.

Claims:

1. In combination, a figure, a screen constituting part of said figure, a projecting apparatus arranged to project luminous images on said screen, and supplementary means for illuminating said screen.

2. An arrangement as claimed in claim 1 characterized in that the supplementary illuminating means illuminate the screen in colors.

3. In combination, a figure, a screen constituting the face of said figure, and a projecting apparatus arranged to project images on said screen.

4. In combination, a figure, a screen constituting the face of said figure, and a projecting apparatus arranged to project images on said screen, and supplementary means for illuminating the screen in colors.

In testimony whereof I hereunto affix my signature.

GEORGES JALBERT.